(12) United States Patent
Huang

(10) Patent No.: US 6,795,132 B2
(45) Date of Patent: Sep. 21, 2004

(54) LIQUID CRYSTAL PROJECTION DISPLAY

(76) Inventor: Shi-Hwa Huang, 2F, No. 14, Lane 133, Jungang Rd., Shindian, Taipei (TW)

(*) Notice: Subject to any disclaimer, the term of this patent is extended or adjusted under 35 U.S.C. 154(b) by 74 days.

(21) Appl. No.: 10/213,620

(22) Filed: Aug. 6, 2002

(65) Prior Publication Data

US 2003/0030758 A1 Feb. 13, 2003

(30) Foreign Application Priority Data

Aug. 9, 2001 (TW) ...................................... 90213589 U

(51) Int. Cl.[7] .......................................... G06F 1/1335
(52) U.S. Cl. ........................ 349/5; 349/6; 349/7; 349/8
(58) Field of Search ............................... 349/5, 6, 7, 8, 349/103

(56) References Cited

U.S. PATENT DOCUMENTS

| | | | | |
|---|---|---|---|---|
| 4,687,301 A | * | 8/1987 | Ledebuhr | .................... 359/634 |
| 5,689,321 A | * | 11/1997 | Kochi | ........................ 349/143 |
| 6,076,931 A | * | 6/2000 | Bone et al. | .................. 353/100 |
| 6,565,211 B1 | * | 5/2003 | Sekine et al. | .................. 353/20 |
| 6,588,906 B2 | * | 7/2003 | Hwang | ........................ 353/31 |

\* cited by examiner

*Primary Examiner*—Daniel A. Hess
(74) *Attorney, Agent, or Firm*—Townsend and Townsend and Crew LLP

(57) ABSTRACT

In a liquid crystal projection display, first, second and third color components of an input light beam are processed by first, second and third polarizers that are disposed respectively perpendicular to propagation directions of the first, second and third color components. First, second and third liquid crystal modulators modulate the first, second and third color components from the polarizers. First, second and third analyzers process the modulated first, second and third color components, respectively, and are disposed perpendicular to the propagation directions of the first, second and third color components. The first, second and third liquid crystal modulators are disposed respectively at an angle relative to a recombiner unit such that an output light beam can be provided by the recombiner unit to a projection lens group with a propagation direction that is parallel to an optical axis of the projection lens group.

4 Claims, 5 Drawing Sheets

LIQUID CRYSTAL PROJECTION DISPLAY

CROSS-REFERENCE TO RELATED APPLICATION

This application claims priority of Taiwan patent Application No. 090213589, filed on Aug. 9, 2001.

BACKGROUND OF THE INVENTION

1. Field of the Invention

The invention relates to a liquid crystal projection display, more particularly to a liquid crystal projection display that can provide an output light beam to a projection lens group with a propagation direction that is parallel to an optical axis of the latter.

2. Description of the Related Art

A conventional projection system is disclosed in U.S. Pat. No. 6,076,931. In the conventional projection system, an illumination beam generated by an illumination source is processed in sequence by a polarizer, a field lens, a reflective LCD, an analyzer and a decentered collimating lens group so as to generate a collimated image beam to a projection lens group. It is noted that the decentered collimating lens group is needed for avoiding the unacceptable displacement of the projected image, thereby resulting in increased costs.

SUMMARY OF THE INVENTION

Therefore, the object of the present invention is to provide a liquid crystal projection display that can provide an output light beam to a projection lens with a propagation direction that is parallel to an optical axis of the latter.

According to the present invention, a liquid crystal projection display is adapted to process an input light beam and to provide an output light beam to a projection lens group that has an optical axis. The input light beam includes first, second and third color components. The liquid crystal projection display comprises:

a splitter unit adapted to receive and separate the input light beam into the first, second and third color components;

first, second and third polarizers, each of which is disposed adjacent to the splitter unit so as to receive and process a respective one of the first, second and third color components, each of the first, second and third polarizers being disposed perpendicular to a propagation direction of the respective one of the first, second and third color components;

first, second and third liquid crystal modulators, each of which is disposed adjacent to a respective one of the first, second and third polarizers so as to receive and be capable of modulating a respective one of the first, second and third color components;

first, second and third analyzers, each of which is disposed adjacent to a respective one of the first, second and third liquid crystal modulators so as to receive and process a respective one of the first, second and third color components, each of the first, second and third analyzers being disposed perpendicular to the propagation direction of the respective one of the first, second and third color components; and a recombiner unit disposed above the splitter unit and disposed adjacent to the first, second and third analyzers so as to receive and recombine the first, second and third color components in order to generate the output light beam;

each of the first, second and third liquid crystal modulators being disposed at an angle relative to the recombiner unit such that the output light beam can be provided by the recombiner unit to the projection lens group with a propagation direction that is parallel to the optical axis.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Figure 1:
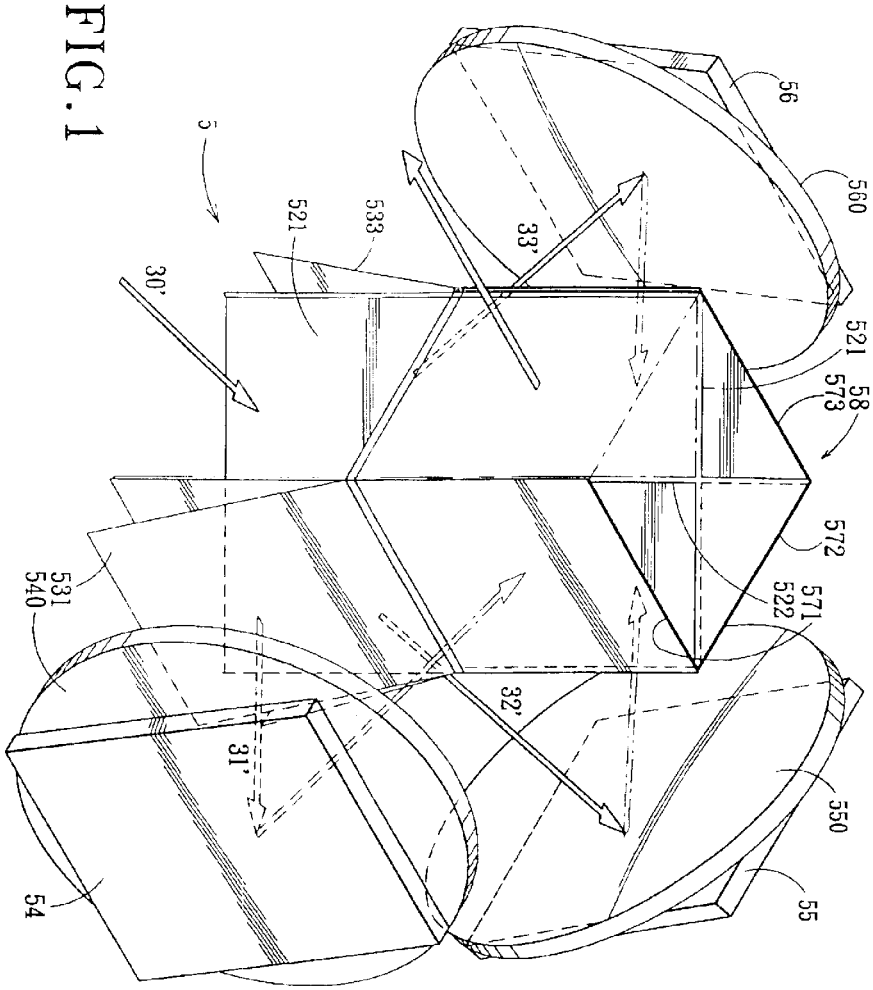
FIG. 1 is a perspective view showing the preferred embodiment of a liquid crystal projection display according to this invention.
Figure 2:
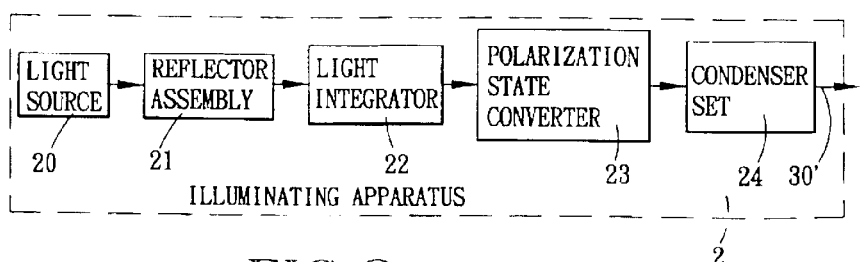
FIG. 2 is a schematic block diagram illustrating how an illuminating apparatus generates an input light beam.
Figure 7:
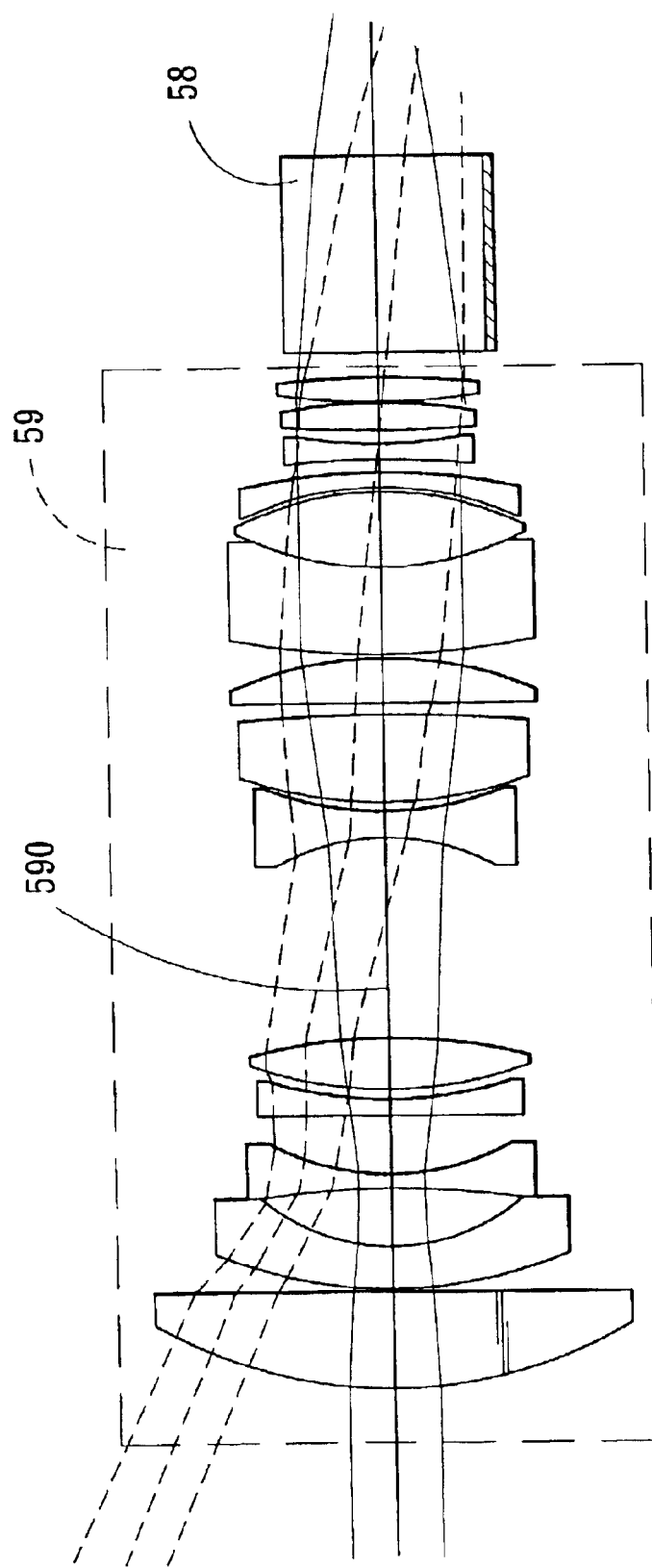
FIG. 7 is a schematic view showing an embodiment of a projection lens group used with the preferred embodiment.
Figure 8:
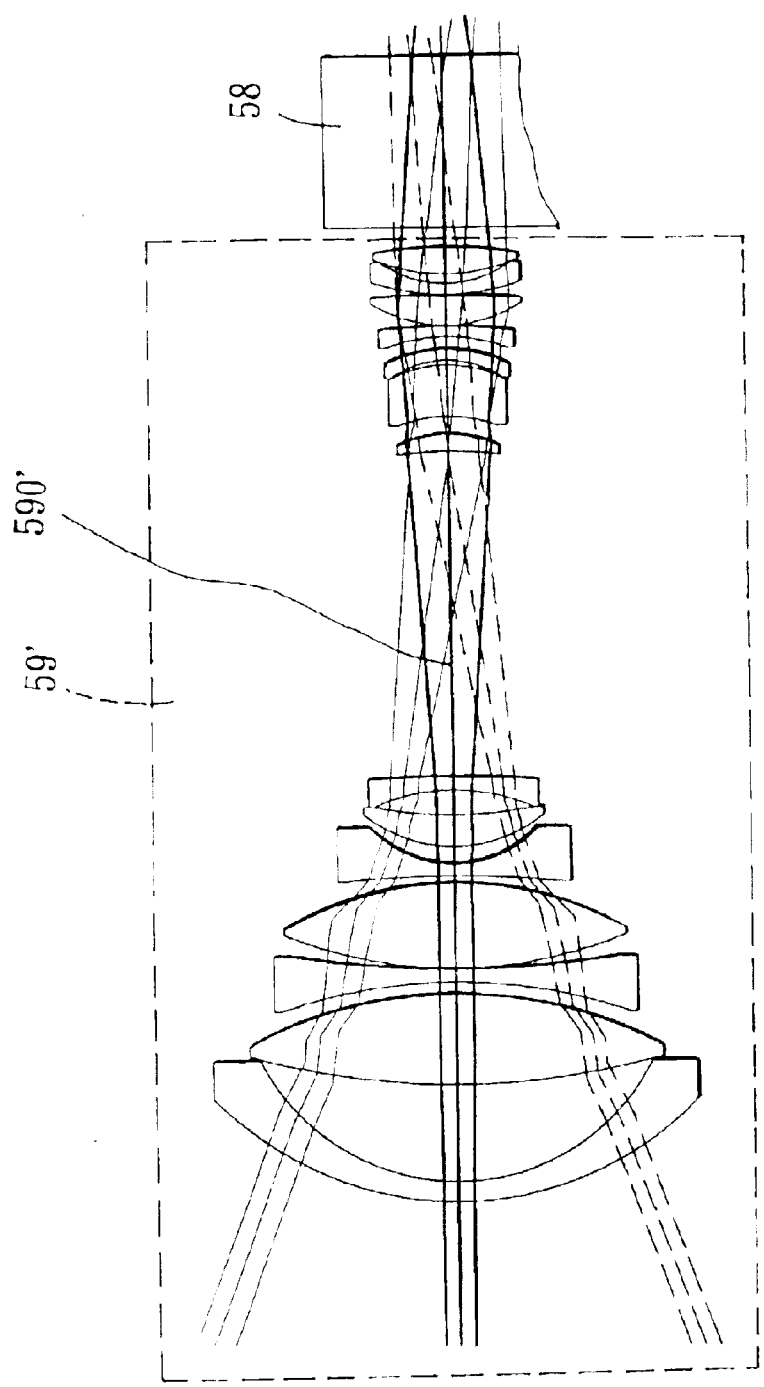
FIG. 8 is a schematic view showing another embodiment of the projection lens group.

Referring to FIG. 1, according to the preferred embodiment of this invention, a liquid crystal projection display 5 is shown to be adapted to process an input light beam 30' and to provide an output light beam to a projection lens group 59, 59' that has an optical axis 590, 590' (see FIGS. 7 and 8). In this embodiment, with further reference to FIG. 2, an illuminating apparatus 2 includes a light source 20 that provides a light output, such as a white light, to be processed in sequence by a reflector assembly 21, a light integrator 22, a polarization state converter 23 and a condenser set 24 so as to generate the input light beam 30'. The input light beam 30' includes first, second and third color components 31', 32', 33'. The liquid crystal projection display 5 includes a splitter unit 52, first, second and third polarizers 531, 532, 533, first, second and third liquid crystal modulators 54, 55, 56, first, second and third analyzers 571, 572, 573, and a recombiner unit 58.

Figure 3:
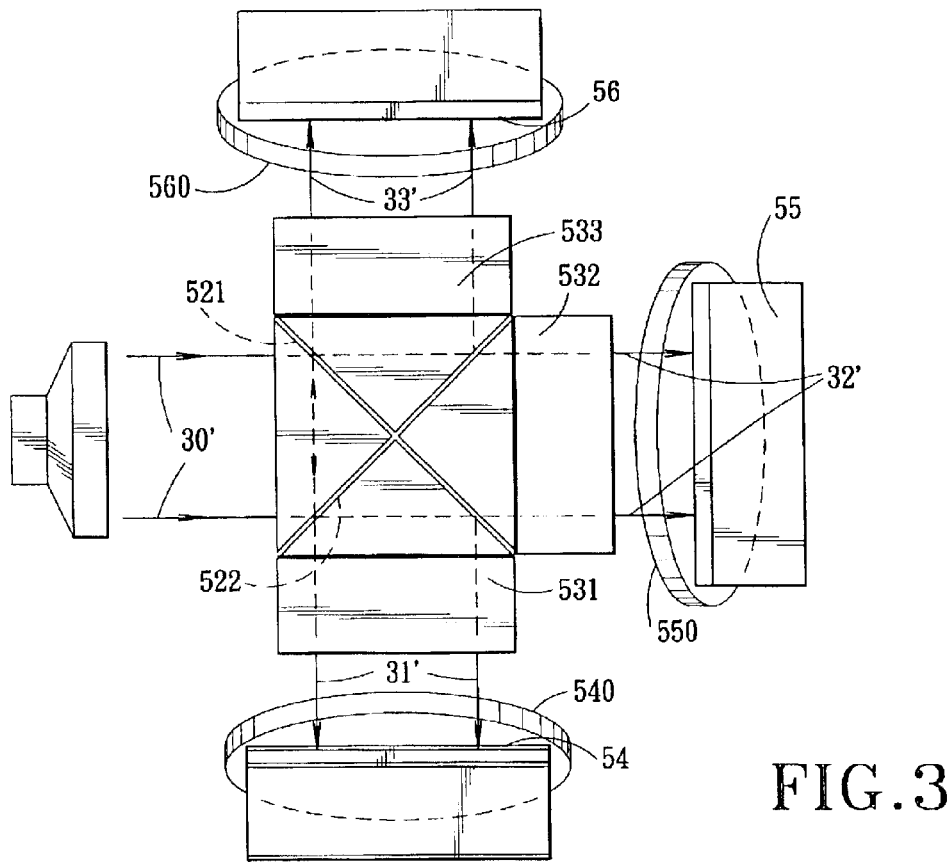
FIG. 3 is a schematic view to illustrate how the input light beam from the illuminating apparatus is processed by a splitter unit, and first, second and third polarizers and liquid crystal modulators of the preferred embodiment.

Referring to FIG. 3, the splitter unit 52 is adapted to receive and separate the input light beam 30' into the first, second and third color components 31', 32', 33'. In this embodiment, the splitter unit 52 is X-shaped and is constructed from first and second filter plates 521, 522 that are perpendicular to each other (see FIG. 3).

Figure 5:
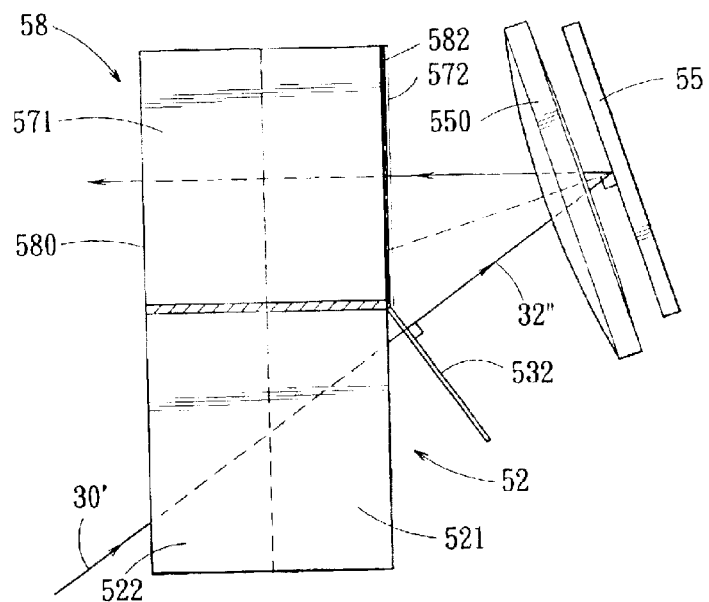
FIG. 5 is a schematic view to illustrate how a second color component of the input light beam is processed by the preferred embodiment.
Figure 6:
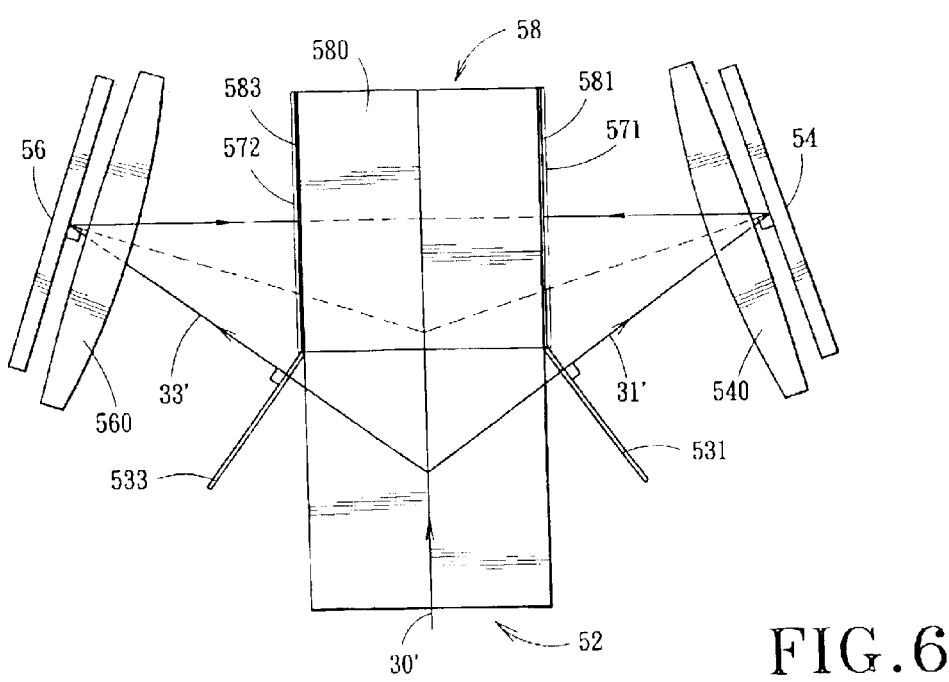
FIG. 6 is a schematic view to illustrate how first and third color components of the input light beam are processed by the preferred embodiment.

Referring to FIGS. 3, 5 and 6, each of the first, second and third polarizers 531, 532, 533 is disposed adjacent to the splitter unit 52 so as to receive and process a respective one of the first, second and third color components 31', 32', 33'. Each of the first, second and third polarizers 531, 532, 533 is disposed perpendicular to a propagation direction of the respective one of the first, second and third color components 31', 32', 33'.

Referring again to FIGS. 3, 5 and 6, each of the first, second and third liquid crystal modulators 54, 55, 56 is disposed adjacent to a respective one of the first, second and third polarizers 531, 532, 533 so as to receive and be capable of modulating a respective one of the first, second and third color components 31', 32', 33' in a known manner. Each of the first, second and third liquid crystal modulators 54, 55, 56 is provided with a positive focusing field lens unit 540, 550, 560 thereon for reducing loss of the respective one of the first, second and third color components 31', 32', 33'.

Referring again to FIGS. 5 and 6, each of the first, second and third analyzers 571, 572, 573 is disposed adjacent to a respective one of the first, second and third liquid crystal modulators 54, 55, 56 so as to receive and process a respective one of the first, second and third color components 31', 32', 33'. Each of the first, second and third analyzers 571, 572, 573 is disposed perpendicular to the propagation direction of the respective one of the first, second and third color components 31', 32', 33'.

Figure 4:
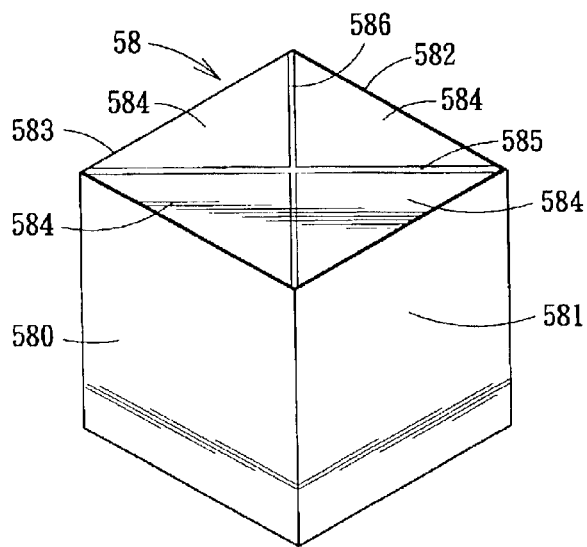
FIG. 4 is a perspective view of a recombiner unit of the preferred embodiment.

Referring again to FIGS. 5 and 6, the recombiner unit 58 is disposed above the splitter unit 52 and is disposed adjacent to the first, second and third analyzers 571, 572, 573 so as to receive and recombine the first, second and third color components 31', 32', 33' in order to generate the output light beam. In this embodiment, as shown in FIG. 4, the recombiner unit 58 is cubic and is constructed from four right-angle triangular prisms 584, and is provided with first and second coated films 585, 586 disposed between each adjacent ones of the prisms 584. The recombiner unit 58, which can be connected integrally to the splitter unit 52, has first, second and third lateral surfaces 581, 582, 583 mounted with a respective one of the first, second and third analyzers 571, 572, 573 (see FIGS. 5 and 6). The recombiner unit 58 further has a fourth lateral surface 580 from which the output light beam can be obtained.

It is noted that each of the first, second and third liquid crystal modulators 54, 55, 56 is disposed at an angle, preferably 5–6 degrees, relative to the recombiner unit 58 such that the output light beam can be provided by the recombiner unit 58 to the projection lens group 59, 59' with a propagation direction that is parallel to the optical axis 590, 590'. Therefore, the decentered collimating lens group used in the above-mentioned prior art can be omitted, thereby resulting in substantially lower costs.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A liquid crystal projection display adapted to process an input light beam and to provide an output light beam to a projection lens group that has an optical axis, the input light beam including first, second and third color components, the liquid crystal projection display comprising:

a splitter unit adapted to receive and separate the input light beam into the first, second and third color components;

first, second and third polarizers, each of which is disposed adjacent to the splitter unit so as to receive and process a respective one of the first, second and third color components, each of the first, second and third polarizers being disposed perpendicular to a propagation direction of the respective one of the first, second and third color components;

first, second and third liquid crystal modulators, each of which is disposed adjacent to a respective one of the first, second and third polarizers so as to receive and be capable of modulating a respective one of the first, second and third color components;

first, second and third analyzers, each of which is disposed adjacent to a respective one of the first, second and third liquid crystal modulators so as to receive and process a respective one of the first, second and third color components, each of the first, second and third analyzers being disposed perpendicular to the propagation direction of the respective one of the first, second and third color components; and a recombiner unit disposed above the splitter unit and disposed adjacent to the first, second and third analyzers so as to receive and recombine the first, second and third color components in order to generate the output light beam;

each of the first, second and third liquid crystal modulators being disposed at an angle relative to the recombiner unit such that the output light beam can be provided by the recombiner unit to the projection lens group with a propagation direction that is parallel to the optical axis of the projection lens group.

2. The liquid crystal projection display as claimed in claim 1, wherein the first, second and third analyzers are mounted on the recombiner unit.

3. The liquid crystal projection display as claimed in claim 2, wherein the recombiner unit is cubic and is constructed from four right-angle triangular prisms, the recombiner unit having first, second and third lateral surfaces mounted with a respective one of the first, second and third analyzers, the recombiner unit further having a fourth lateral surface from which the output light beam can be obtained.

4. The liquid crystal projection display as claimed in claim 1, wherein each of the first, second and third liquid crystal modulators is provided with a positive focusing field lens unit thereon.

* * * * *